United States Patent
Bacher et al.

(10) Patent No.: US 7,275,857 B2
(45) Date of Patent: Oct. 2, 2007

(54) APPARATUS FOR TREATING PLASTICS MATERIAL

(75) Inventors: Helmut Bacher, St. Florian (AT); Helmuth Schulz, Linz (AT); Georg Wendelin, Linz (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 520 days.

(21) Appl. No.: 10/513,211

(22) PCT Filed: May 3, 2003

(86) PCT No.: PCT/AT03/00158

§ 371 (c)(1),
(2), (4) Date: Nov. 1, 2004

(87) PCT Pub. No.: WO03/103916

PCT Pub. Date: Dec. 18, 2003

(65) Prior Publication Data

US 2005/0170029 A1    Aug. 4, 2005

(30) Foreign Application Priority Data

Jun. 10, 2002 (AT) ............................ A 878/2002

(51) Int. Cl.
- *B01F 7/26* (2006.01)
- *B29B 7/44* (2006.01)
- *B29C 67/02* (2006.01)
- *B29B 17/00* (2006.01)

(52) U.S. Cl. ...................... 366/314; 366/317
(58) Field of Classification Search ........... 366/76.1, 366/76.93, 315, 316, 317, 314; 425/6
See application file for complete search history.

(56) References Cited

U.S. PATENT DOCUMENTS

| | | | |
|---|---|---|---|
| 2,424,679 A | 7/1947 | Cowles | |
| 2,665,853 A | 1/1954 | Nicholson | |
| 3,155,376 A * | 11/1964 | Mollenbruck | ................ 366/77 |
| 3,638,917 A | 2/1972 | Osten | |

(Continued)

FOREIGN PATENT DOCUMENTS

DE         1144693 B         3/1963

(Continued)

*Primary Examiner*—Tony G. Soohoo
(74) *Attorney, Agent, or Firm*—Townsend and Townsend and Crew, LLP

(57) ABSTRACT

A device for treating plastics material, in particular thermoplastic plastics material, has a receiving container (1) which has a base (15) and lateral walls (14). In the receiving container at least [one] disc (17) is arranged close to the base (15), and is driven by a vertical shaft (18) so as to rotate about its axis and carries tools (22), as a result of which a circulating movement about the axis of the shaft (18) is imparted to the material present in the receiving container (1). At least one blade (26) which projects beyond the edge of the disc (17) in the direction towards the lateral wall (14) is fastened to the said edge of the disc (17) adjacent to the lateral wall (14). The blade is inclined with respect to the horizontal plane in such a way that the plastics material moved by the tool (22) or the tool carrier (16) during its circulation is given an upwardly directed movement component.

10 Claims, 2 Drawing Sheets

U.S. PATENT DOCUMENTS

| | | | | |
|---|---|---|---|---|
| 4,222,728 | A * | 9/1980 | Bacher et al. | 425/305.1 |
| 4,460,277 | A * | 7/1984 | Schulz et al. | 366/76.3 |
| 4,548,765 | A * | 10/1985 | Hultholm et al. | 261/93 |
| 4,894,001 | A * | 1/1990 | Petschner | 425/200 |
| 4,979,986 | A * | 12/1990 | Hill et al. | 75/711 |
| 5,078,505 | A * | 1/1992 | Nyman et al. | 366/262 |
| 5,102,326 | A * | 4/1992 | Bacher et al. | 425/202 |
| 5,110,055 | A * | 5/1992 | Teeny | 241/15 |
| 5,240,327 | A * | 8/1993 | Nyman et al. | 366/302 |
| 5,409,313 | A | 4/1995 | Funk | |
| 5,783,225 | A * | 7/1998 | Bacher et al. | 425/202 |
| 5,947,599 | A | 9/1999 | Funk | |
| 5,988,865 | A * | 11/1999 | Bacher et al. | 366/76.93 |
| 6,619,575 | B1 * | 9/2003 | Bacher et al. | 241/46.11 |
| 6,719,454 | B1 * | 4/2004 | Bacher et al. | 366/314 |
| 6,883,953 | B1 * | 4/2005 | Bacher et al. | 366/76.1 |
| 7,070,174 | B2 * | 7/2006 | Hultholm et al. | 261/84 |
| 7,137,802 | B2 * | 11/2006 | Bacher et al. | 425/217 |
| 2004/0202744 | A1 * | 10/2004 | Bacher et al. | 425/207 |
| 2005/0170029 | A1 * | 8/2005 | Bacher et al. | 425/6 |
| 2005/0287237 | A1 * | 12/2005 | Bacher et al. | 425/217 |
| 2006/0093696 | A1 * | 5/2006 | Bacher et al. | 425/200 |

FOREIGN PATENT DOCUMENTS

| | | |
|---|---|---|
| DE | 2814958 A1 | 11/1978 |
| WO | WO93/18902 A1 | 9/1993 |
| WO | WO 3103916 A1 * | 12/2003 |

* cited by examiner

APPARATUS FOR TREATING PLASTICS MATERIAL

The invention relates to a device for treating plastics material, in particular thermoplastic plastics material, having a receiving container, which has a base and lateral walls, and having tools, which are arranged in the receiving container and which are carried by a shaft which passes through the base of the receiving container in a sealed manner and which is driven by a motor so as to rotate about its axis, at least one tool being fastened on a tool carrier, designed in the form of a disc, on the top face of the disc, the disc being situated close to the base of the receiving container so that the plastics material present in the receiving container is set in a circulating movement about the axis of the shaft.

Devices of this type are known (e.g. AT 375 867 B, AT 407 970 B or WO 93/18902). On account of the rotating tool carriers or tools, the plastics material being treated is flung by the action of centrifugal force against the lateral wall of the container. A portion of this plastics material rises along the lateral wall of the container and circulates in the form of a mixing cone, but eventually drops back into the centre of the container again. This results in the desired dwell period of the treated particles of plastics material in the receiving container, so that the plastics material introduced into it is thoroughly mixed, is sufficiently heated by the frictional forces which occur, and, in the case of tools which have a comminuting effect upon the plastics material, is also sufficiently comminuted. It has been found, however, that the plastics material flung towards the lateral wall of the container does not all rise up on the said wall, but a portion goes down below the lowest tool or below the lowest disc forming a tool carrier. There this portion of plastics material can become fused on in an uncontrolled manner as a result of friction. Attempts have been made to avoid this drawback by the attachment of conveying ribs on the underside of the said disc, but this step is not entirely satisfactory.

The object of the invention is to avoid with little outlay the drawback described, so as thereby not only to reduce the susceptibility of the device to breakdown, but also to treat in a more uniform manner all the plastics material introduced into the receiving container, since the residue of plastics material in the region of the container base, i.e. below the lowest tool, is effectively counteracted. This object is attained according to the invention in that the disc carries, in addition to the tools, at least one blade which projects beyond the edge of the disc in the direction towards the lateral wall of the receiving container and is inclined with respect to the horizontal plane in such a way that the plastics material flung off from the disc by the tools is given an upwardly directed movement component during its circulation. Irrespectively of whether the circulation of the plastics material is now carried out only by the tools or, in addition, by tool carriers carrying the latter (individual tools or tool carriers could be formed by rods alone which project outwards from the shaft in the horizontal direction), the moved plastics material is deflected upwards by way of the blades, and this effectively prevents the material from dropping down. This effect can be utilized not only to prevent, to the greatest possible extent, the treated plastics material from dropping below the lowest tool carrier formed by the disc, but also in order that plastics material which has dropped down may be immediately returned to the revolving mixing cone again and is not fused on below the lowest tool carrier with friction during a prolonged dwell period in an uncontrolled manner. If a plurality of tool carriers are arranged one above the other in a plurality of planes, then the blades in the upper tool carriers result in a displacement of the circulating plastics material upwards and thus in a prolongation of the dwell period.

In accordance with a preferred embodiment of the invention, the blade also projects upwards and below beyond the disc, in order to make as large as possible the active area acting upon the plastics material.

Since, as already mentioned, discs arranged in the base region of the receiving container and forming [the] tool carriers are known, within the scope of the invention it is possible for already existing plants of this type to be re-fitted without difficulty.

Further characterizing features and advantages of the invention may be seen in the description of embodiments which are illustrated diagrammatically in the drawing.

Figure 1:
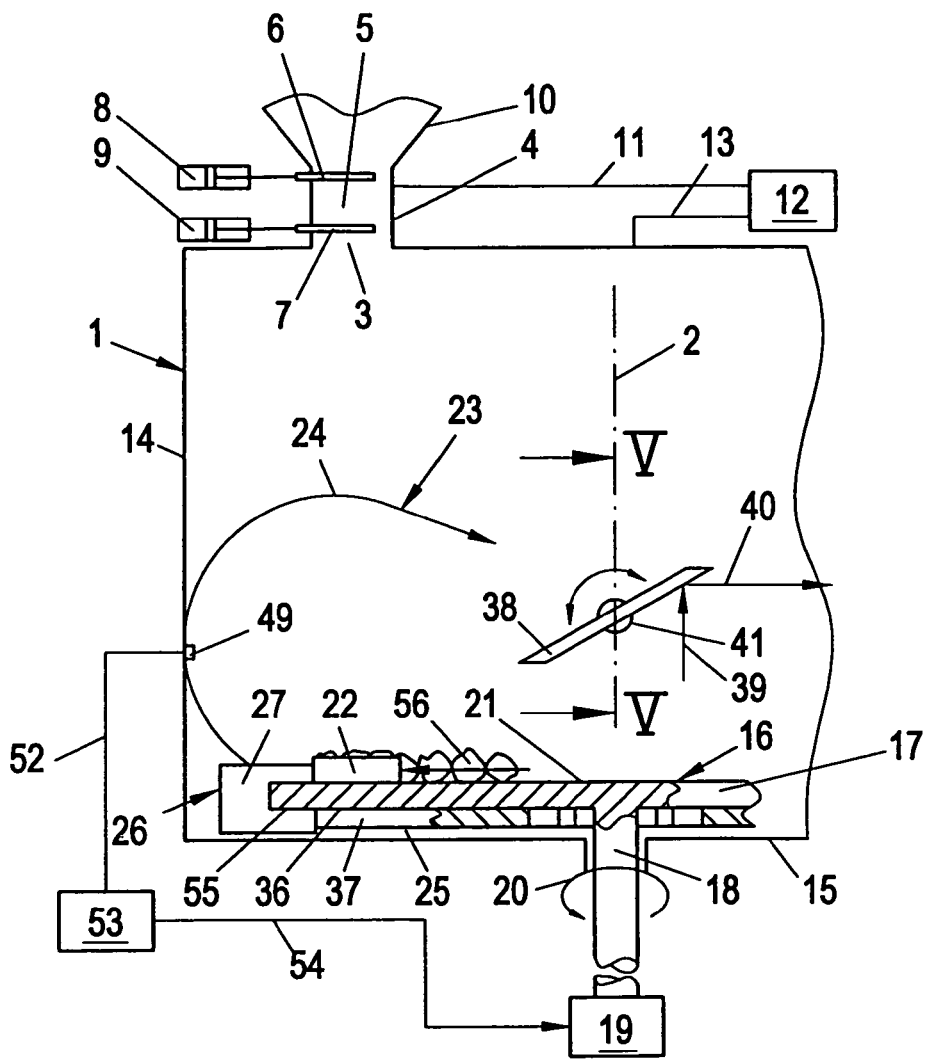
FIG. 1 is a vertical section through a device according to the invention.

The device as shown in FIG. 1 has a receiving container 1 with a circular cross-section and with a vertical axis 2, into which the plastics material to be treated, in particular of a thermoplastic nature, for example PETP (polyethyleneterephthalate), is introduced in the form of grinding material consisting bottles or bottle pre-forms, sheets, flakes etc. from above through a charge opening 3. If the material to be treated has to be treated under vacuum, the said opening 3 has a sluice 4 attached to it, the sluice chamber 5 of which can be closed off by two slides 6, 7 which can be moved in a reciprocating manner by double-acting cylinders 8, 9. A filling funnel 10, into which the material to be treated is introduced batch-wise or continuously by a supply device (not shown), for example a conveyor belt, is attached to the sluice 4 at the top. An evacuation line 11, which leads to an evacuation device 12, is attached to the sluice chamber 5. A further evacuation line 13 leads from the receiving container 1 to the evacuation device 12.

Figure 3:
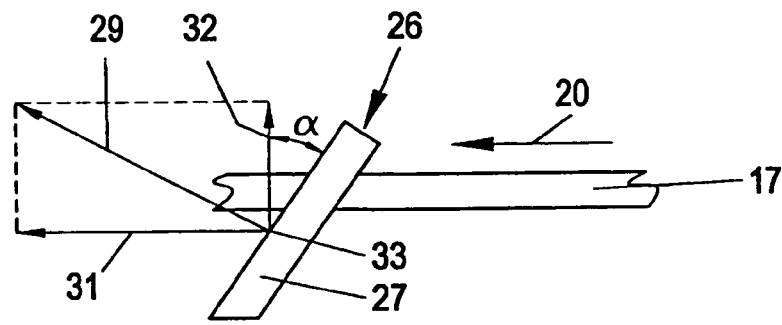
FIG. 3 is a view in the direction of the arrow III in FIG. 2.
Figure 4:
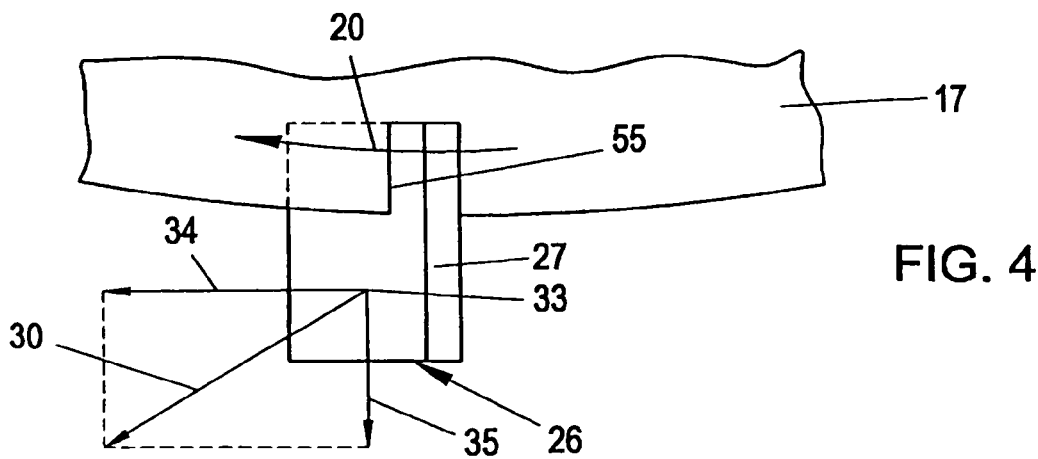
FIG. 4 is a plan view in the direction of the arrow IV in FIG. 2.

The receiving container 1 has vertical lateral walls 14 and a horizontal base 15. A tool carrier 16, which is formed by a horizontal circular disc 17 (see FIG. 2 also), is arranged close to the base 15, the circular disc 17 being mounted on a shaft 18 which passes through the base 15 in a vacuum-tight manner and which is driven by a motor 19 so as to rotate in the direction of the arrow 20. The top face 21 of the disc 17 of the tool carrier 16 carries a plurality of tools 22 which are distributed at uniform intervals about the periphery of the tool carrier 16 and which act upon the plastics material present in the container 1 during the rotation of the disc 17. As a result, the said plastics material is caused to circulate about the axis 2, and, on the other hand, centrifugal force seeks to move the plastics material in the radial direction towards the lateral wall 14. A mixing cone 23 is formed in such a way that a portion of the plastics material rises along the lateral wall 14, reaches a culmination point 24 during this circulation and finally drops back again into the region of the container axis 2. Not all the plastics material takes part in this ascent, however, since a portion of the plastics material flung off from the disc 17 seeks to enter the space 25 below the disc 17. In order to prevent this, the disc 17 carries a plurality of blades 26 (see FIGS. 2 to 4 also)

which are arranged distributed at uniform intervals about the periphery of the disc and each of which can be formed by a flat plate 27, the plane of which is directed radially with respect to the centre of the disc 17, but is arranged at an inclination to the vertical direction. This angle of inclination a (FIG. 3) can be selected differently depending upon the field of application in question, advantageous angles of inclination being between 15 and 30° according to experience. This arrangement and inclination of the blades 26 relative to the plane of the disc 17 of the tool carrier 16 has the effect that during the rotation of the disc 17 in the direction of the arrow 20 a theoretical force vector 28 (FIG. 2) is exerted upon the particles of plastics material moved by the blade 26 in each case (ignoring other, relatively insignificant influencing variables, such as friction of the particles against one another etc.). When projected into a vertical plane, this force vector 28 has a component 29 (FIG. 3), and when projected into a horizontal plane (FIG. 4) it has a horizontal component 30. The vertical component 29 is formed from two portions 31, 32. The portion 31 extends from the point 33 under consideration in each case in a direction which is orientated tangentially to a circle—passing through the point 33—about the container axis 2 which coincides with the axis of the shaft 18. This portion is produced by the shear force acting in the rotating direction of the disc 17. The portion 32 extends from the point 33 under consideration in each case in a vertical direction and is produced by the inclination of the plate 27 of the blades 27. This vertical component 29 is at a right angle to the plane of the plate 27.

In the horizontal projection (FIG. 4) the horizontal component 30 has a portion 34, starting from the point 33 in the above-mentioned tangential direction, and a portion 35, which is produced by centrifugal force and which extends in the radial direction of the disc 17.

The said blades 26 impart a preferred movement upwards to the plastics material flung off from the disc 17 by the tools 22 and thus effectively prevent portions of plastics material from being able to enter the space 25 below the disc 17 of the tool carrier 16 during the treatment of the material in the container 1. This can be assisted by ribs 37 which are arranged on the bottom face 36 of the disc 17 and which are arranged in such a way, radially for example, that the plastics material present in the space 25 is conveyed in the direction towards the lateral wall 14. The plastics material moved outwards in this way is then engaged by the blades 26 and is conveyed upwards again.

An increase in the energy introduced into the plastics material present in the container 1 during the rotation of the tool carrier 16 can be achieved in that guide faces in the form of guide blades 38 (FIG. 1) are attached to the inside of the lateral wall 14 of the receiving container 1, the guide blades 38 preventing, when arranged appropriately, the particles of plastics material circulating in the container 1 from being able to escape freely upwards and thus absorbing relatively little energy in the form of frictional heat. Expressed in simple terms, the particles of plastics material ascending upwards encounter the guide blades 38 in the direction of the arrow 39 and, as a result, receive a movement component in the horizontal direction (arrow 40). This deflexion of the moved particle of plastics material has the effect that part of its kinetic energy is converted into frictional energy and, as a result, the particle is heated.

Figure 6:
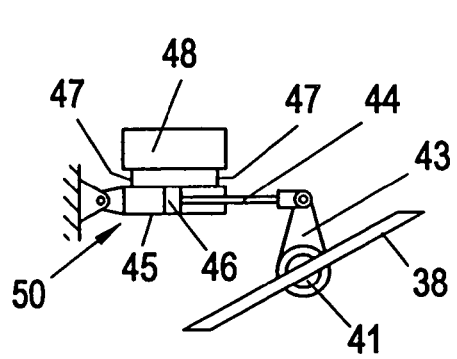
FIG. 6 shows a detail of FIG. 5 in a side view.
Figure 5:
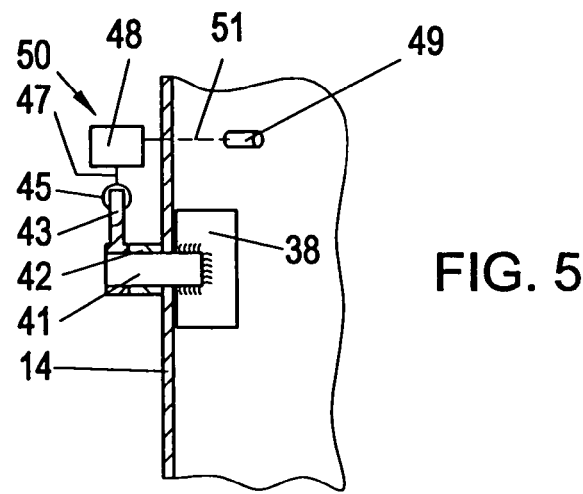
FIG. 5 is a section along the line V-V in FIG. 1.

In order to be able to adapt to different conditions, it is advantageous for at least one of the guide blades 38 to be made adjustable. This could be carried out by changing the active area of the guide blades 38, for example by insertion into the container to different degrees. What is structurally more advantageous is an adjustment of the angle of inclination of the guide blades 38 by means of a shaft 41 (FIGS. 1, 5) which is connected to it and which passes through the lateral wall 14 of the container 1 and is mounted in a bearing 42 fastened to the lateral wall 14. The said shaft 41 can be rotatable manually, for example by means of a hand wheel, or by a motor. A motor-driven adjustment device 50 is illustrated in FIGS. 5 and 6. The shaft 41 is connected to a pivot lever 43 to which the piston rod 44 of a double-acting cylinder 45 is articulated, the end of which remote from the pivot lever 43 is mounted in a non-displaceable, but pivotable manner. The piston 46 guided in the cylinder 45 is acted upon with pressure medium by a pressure-medium shaft 48 by way of lines 47, the said pressure-medium shaft 48 being controlled in any suitable manner, preferably electronically, in a manner dependent upon the nature of the plastics material to be treated.

As a rule, it is advisable to monitor the temperature of the plastics material present in the receiving container 1, in order to keep its heating to the desired level or to control it in a suitable manner. To this end it is possible for at least one temperature probe 49 to be provided in the receiving container 1, the temperature probe 49 being advantageously arranged on the inner face of the lateral wall 14 and in a vertical region in which the mixing cone 23 is present. One or more of the said temperature probes 49 can be used to control the adjustment device 50 for at least one of the guide blades 38, and this is indicated by a line 51 in FIG. 5. In addition or alternatively to this, the temperature probe or probes 49 can be connected by way of a line 52 (FIG. 1) to a regulating device 53 which controls the rotational speed of the motor 19 by way of a line 54.

As shown in the drawing, each blade 26 projects in the radial direction beyond the periphery of the disc 17 of the tool carrier 16. In addition, the blade also extends upwards and downwards beyond the top face 21 or the bottom face 36 of the disc 17, in order to increase the active area of each blade 26. The plate 27 of each blade 26 can be provided with a slot 55 in which the edge of the disc 17 engages. It is also possible, however, for the arrangement to be reversed, i.e. an arrangement with the slot in the disc 17, in which case the non-slotted plate 27 then engages in the said slot. This connexion can be secured by welding or in some other suitable manner. In many cases, however, it will be advisable for the plate 27 to be fastening to the disc 17 by screwing.

The plate 27 of each blade 26 need not be flat, and it would be possible for the plate 27 to be curved slightly, the concave side being arranged on the leading side of the plate. Such a curvature could have the effect that the particles of plastics material slide for a brief time on the plate 27 before they are deflected upwards. This would result in a gentle acceleration and treatment of the particles of plastics material.

Figure 2:
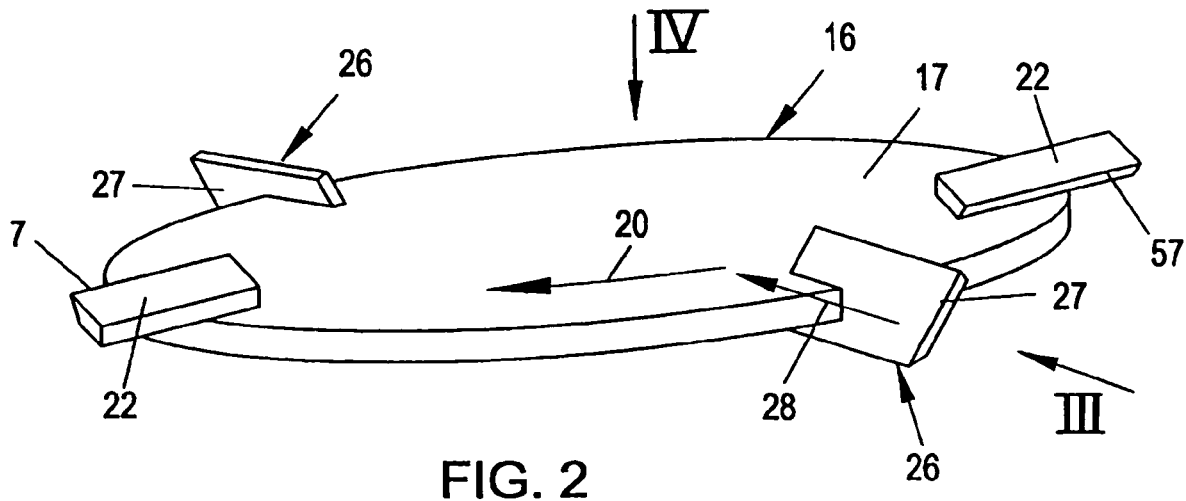
FIG. 2 shows a disc-shaped tool carrier designed with blades, in an axonometric view.

It may be seen in FIG. 2 that the blades 26 are arranged offset with respect to the tools 22 in the peripheral direction of the disc 17. It is more favourable, however, for the blades 26 to be arranged in a continuation of the tools 22, which is illustrated in FIG. 1 and has the advantage that the particles of plastics material moved by the tools 22 in the direction of the arrow 56 (FIG. 1) are guided directly onto the blades 26.

The above-mentioned arrangements of the blades 26 can also be made in designs in which a plurality of tool carriers 16 are arranged one above the other, in which case it is not necessary for all the tool carriers to be constructed in the form of discs and to be provided with blades, but only the tool carrier 16 situated closest to the base 15 of the container.

It would also be possible for the blades 26 to be provided, not on the disc-shaped tool carrier 16, but directly on the tools 22.

As a rule, the plastics material to be treated is introduced already comminuted beforehand into the receiving container 1. If comminution in the container 1 is necessary, the tools 22 can be formed accordingly, for example as cutters with cutting edges 57 (FIG. 2).

The invention claimed is:

1. Apparatus for treating plastics material, comprising a receiving container, which has a base and lateral walls as well as at its top a charge opening for the material to be treated, tools arranged in the receiving container and carried by a shaft which passes through the base of the receiving container in a sealed manner, said shaft being driven by a motor so as to rotate about its axis, at least one tool being fastened on a tool carrier designed in the form of a disc on the top face of the disc, which disc being situated close to the base of the receiving container so that the plastics material present in the receiving container is set in a circulating movement about the axis of the shaft, wherein the disc carries, in addition to the tools, a plurality of blades which project beyond the edge of the disc in the direction towards the lateral wall of the receiving container, the active surface of the blades being inclined with respect to the horizontal plane in such a way that the plastics material flung off from the disc by the tools is given an upwardly directed movement component during its circulating, and wherein the blades also project upwards and below beyond the disc.

2. Apparatus according to claim 1, wherein each blade is formed by a plate which is fastened on the disc obliquely to the plane of the said disc.

3. Apparatus according to claim 2, wherein each blade is formed by a flat plate.

4. Apparatus according to claim 1, wherein the edge of the disc carries a plurality of blades which are distributed at equal intervals about the periphery of the disc.

5. Apparatus according to claim 4, wherein the blades are offset relative to the tools in the peripheral direction of the disc.

6. Apparatus according to claim 1, wherein, as viewed in the radial direction of the disc, at least one blade adjoins the tool on the outside or is arranged in a continuation of the tool.

7. Apparatus according to claim 1, wherein ribs, which convey plastics material present below the disc outwards in the direction towards the blades, are provided on the bottom face of the disc.

8. Apparatus according to claim 1, wherein at least one blade has a slot into which the edge of the disc is inserted, or the disc has a slot into which the blade engages, or the blade is fastened to the disc by screwing.

9. Apparatus according to claim 1, wherein the blades are inclined by 15 to 30° relative to the vertical plane.

10. Apparatus according to claim 1, wherein at least one blade is made concave on its leading side.

* * * * *